(12) United States Patent
Kurian

(10) Patent No.: US 10,958,661 B2
(45) Date of Patent: Mar. 23, 2021

(54) MULTI-LAYER AUTHENTICATION SYSTEM WITH SELECTIVE LEVEL ACCESS CONTROL

(71) Applicant: Bank of America Corporation, Charlotte, NC (US)

(72) Inventor: Manu Kurian, Dallas, TX (US)

(73) Assignee: Bank Of America Corporation, Charlotte, NC (US)

(*) Notice: Subject to any disclaimer, the term of this patent is extended or adjusted under 35 U.S.C. 154(b) by 176 days.

(21) Appl. No.: 16/202,423

(22) Filed: Nov. 28, 2018

(65) Prior Publication Data

US 2020/0169568 A1     May 28, 2020

(51) Int. Cl.
*H04L 29/06*     (2006.01)
*H04W 12/06*     (2009.01)
*H04L 29/08*     (2006.01)

(52) U.S. Cl.
CPC ............ *H04L 63/105* (2013.01); *H04L 63/08* (2013.01); *H04W 12/06* (2013.01)

(58) Field of Classification Search
CPC ..... H04L 63/08; H04L 63/105; H04L 63/205; H04W 12/06
USPC .......... 726/2, 3, 4, 7, 11; 235/275, 380, 382, 235/492
See application file for complete search history.

(56) References Cited

U.S. PATENT DOCUMENTS

| | | |
|---|---|---|
| 4,795,890 A | 1/1989 | Goldman |
| 5,757,918 A | 5/1998 | Hopkins |
| 6,710,700 B1 | 3/2004 | Tatsukawa et al. |
| 7,576,650 B1 | 8/2009 | Ghaffari |
| 7,606,560 B2 | 10/2009 | Labrou et al. |
| 7,884,724 B2 | 2/2011 | Tuttle et al. |

(Continued)

OTHER PUBLICATIONS

"PSP: Private and Secure Payment with RFID"—Blab et al, Eurecom, Tu Darmstadt, Mar. 2009 http://citeseerx.ist.psu.edu/viewdoc/download?doi=10.1.1.215.3457&rep=rep1&type=pdf (Year: 2009).*

*Primary Examiner* — Randy A Scott

(74) *Attorney, Agent, or Firm* — Banner & Witcoff, Ltd.; Michael Springs

(57) ABSTRACT

Systems for providing multi-layer authentication are provided. In some examples, a system may receive data associated with a signal detected by a computing device. The signal may be emitted from a smart processing device. The received signal data may be compared to pre-stored signal data to determine whether a match exists. If not, an instruction disabling functionality of the smart processing device may be generated and transmitted to the smart processing device. If so, an instruction enabling functionality of the smart processing device may be generated and transmitted. The system may generate a request for next layer authentication data. The request may be transmitted to one or more computing devices and next layer authentication response data may be received. The next layer authentication response data may be compared to pre-stored next layer authentication data to determine whether a match exists. If not, an instruction disabling functionality of the smart processing device may be generated and transmitted. If so, an instruction enabling additional functionality of the smart processing device may be generated and transmitted.

13 Claims, 13 Drawing Sheets

(56) References Cited

U.S. PATENT DOCUMENTS

| | | |
|---|---|---|
| 8,280,351 B1 | 10/2012 | Ahmed et al. |
| 8,955,075 B2 | 2/2015 | Von Bokern et al. |
| 9,135,615 B1* | 9/2015 | Mutha .................... G06Q 20/12 |
| 9,275,389 B1* | 3/2016 | Dides .................... G06Q 20/341 |
| 2005/0109845 A1 | 5/2005 | Ghaffari |
| 2005/0253683 A1 | 11/2005 | Lowe |
| 2006/0158313 A1 | 7/2006 | Satou |
| 2006/0187061 A1 | 8/2006 | Colby |
| 2013/0015955 A1 | 1/2013 | Luong |
| 2013/0275305 A1* | 10/2013 | Duplan ................ G06Q 20/102 |
| | | 705/44 |
| 2014/0125459 A1 | 5/2014 | Sabahialshoara et al. |
| 2014/0196820 A1 | 7/2014 | Gray et al. |
| 2015/0079326 A1 | 3/2015 | Snow et al. |
| 2015/0249920 A1* | 9/2015 | Lestario .................. H04W 4/80 |
| | | 455/411 |
| 2016/0087957 A1* | 3/2016 | Shah ....................... H04L 63/08 |
| | | 726/1 |

* cited by examiner

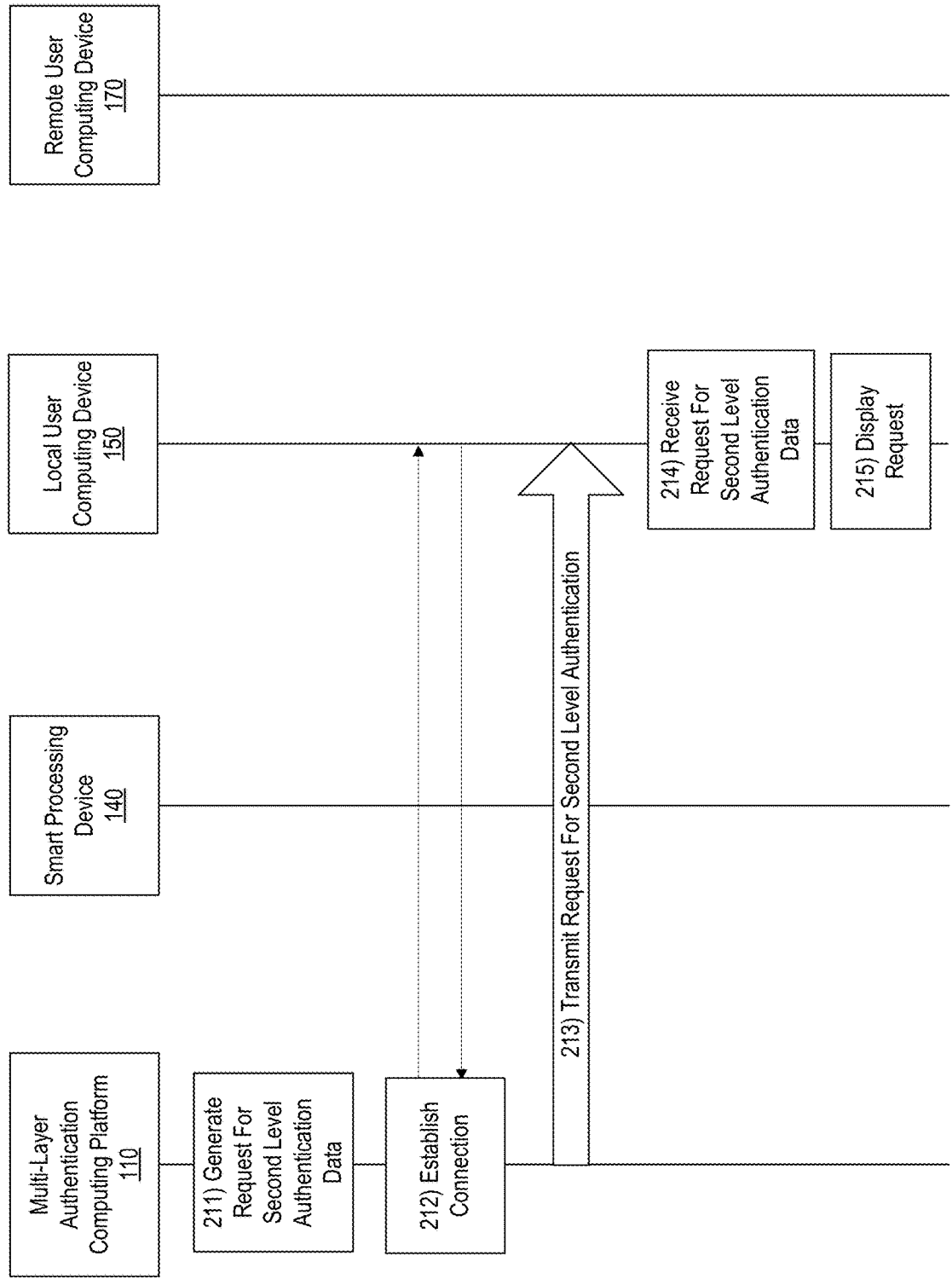

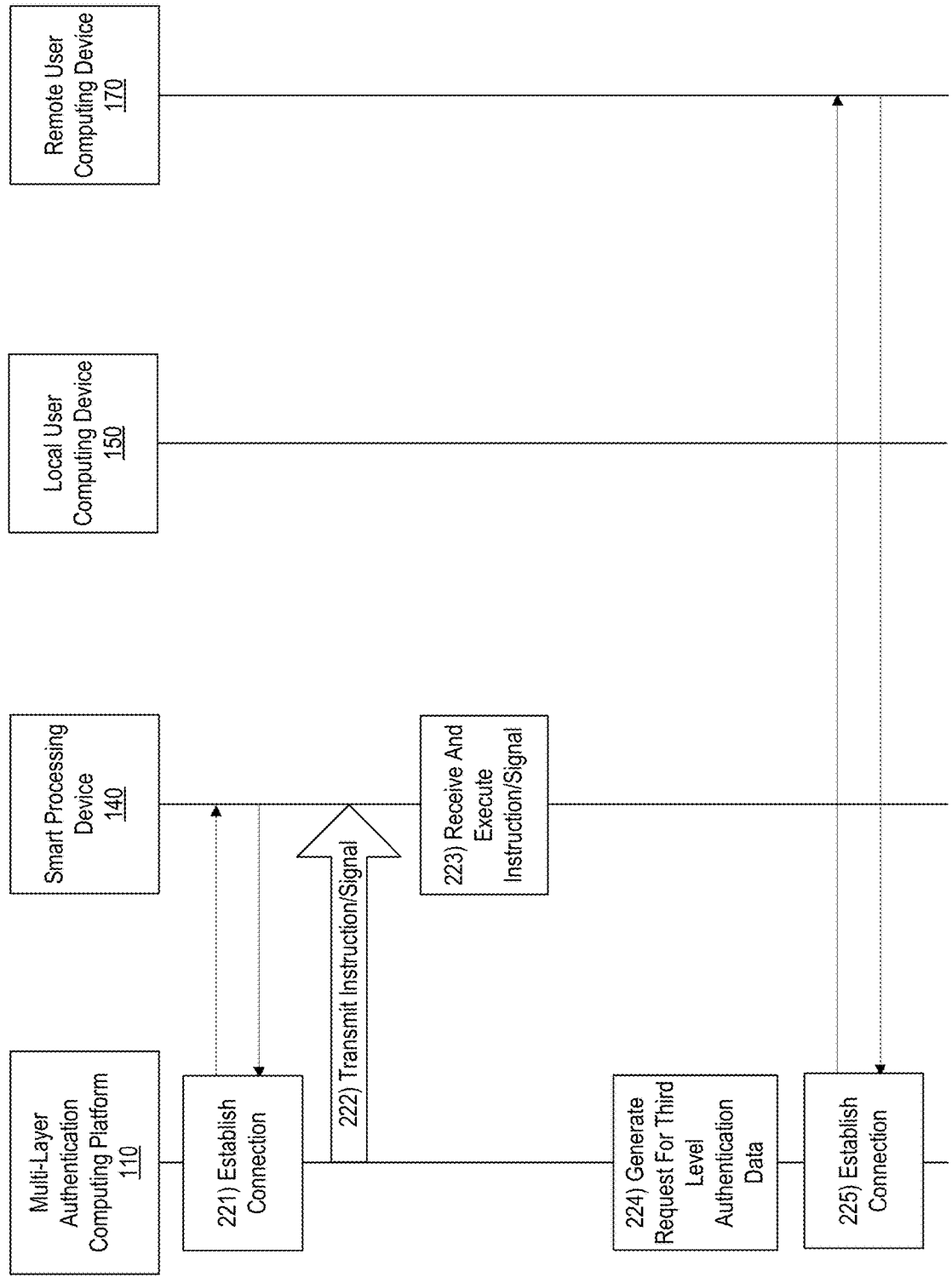

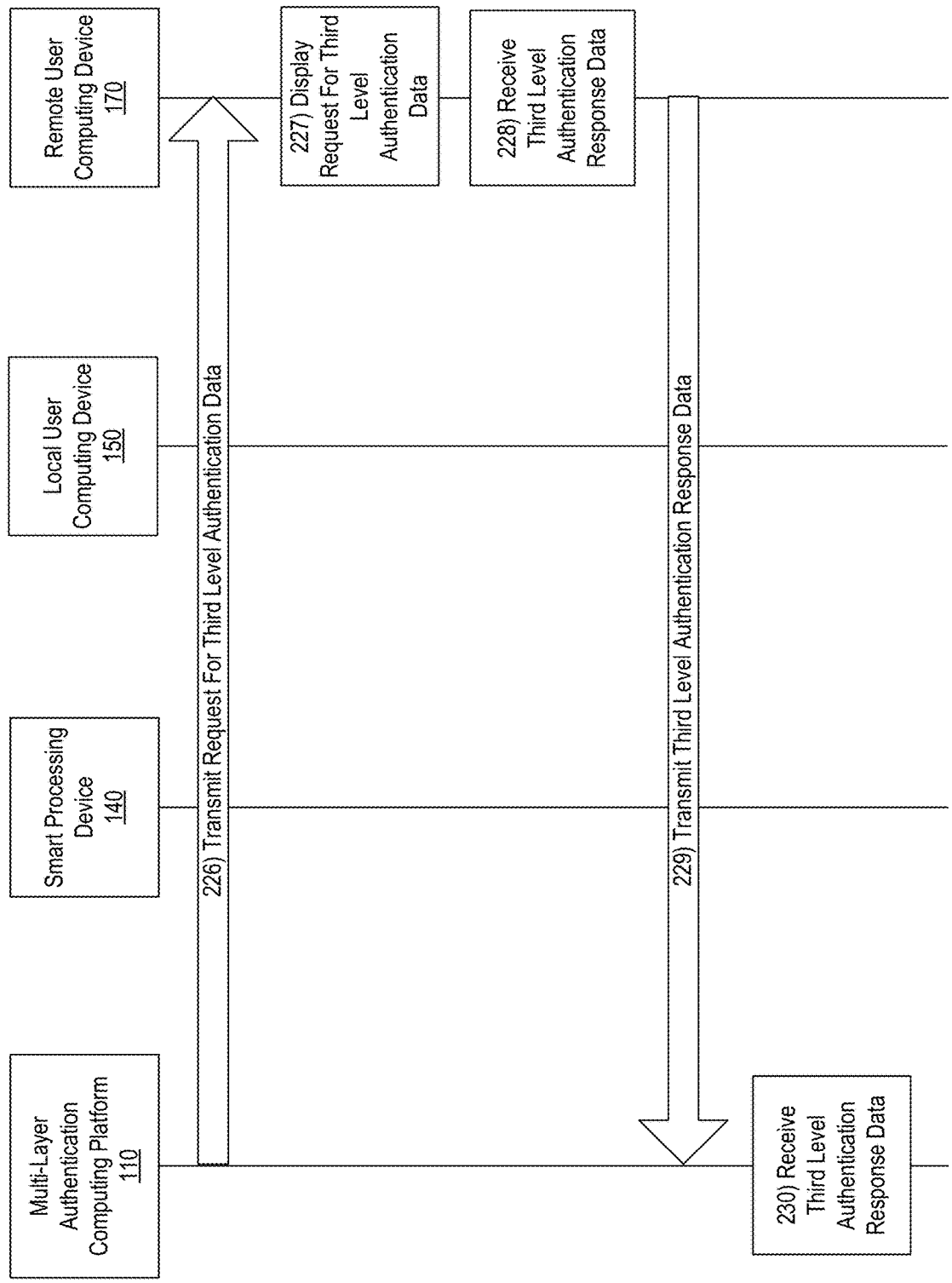

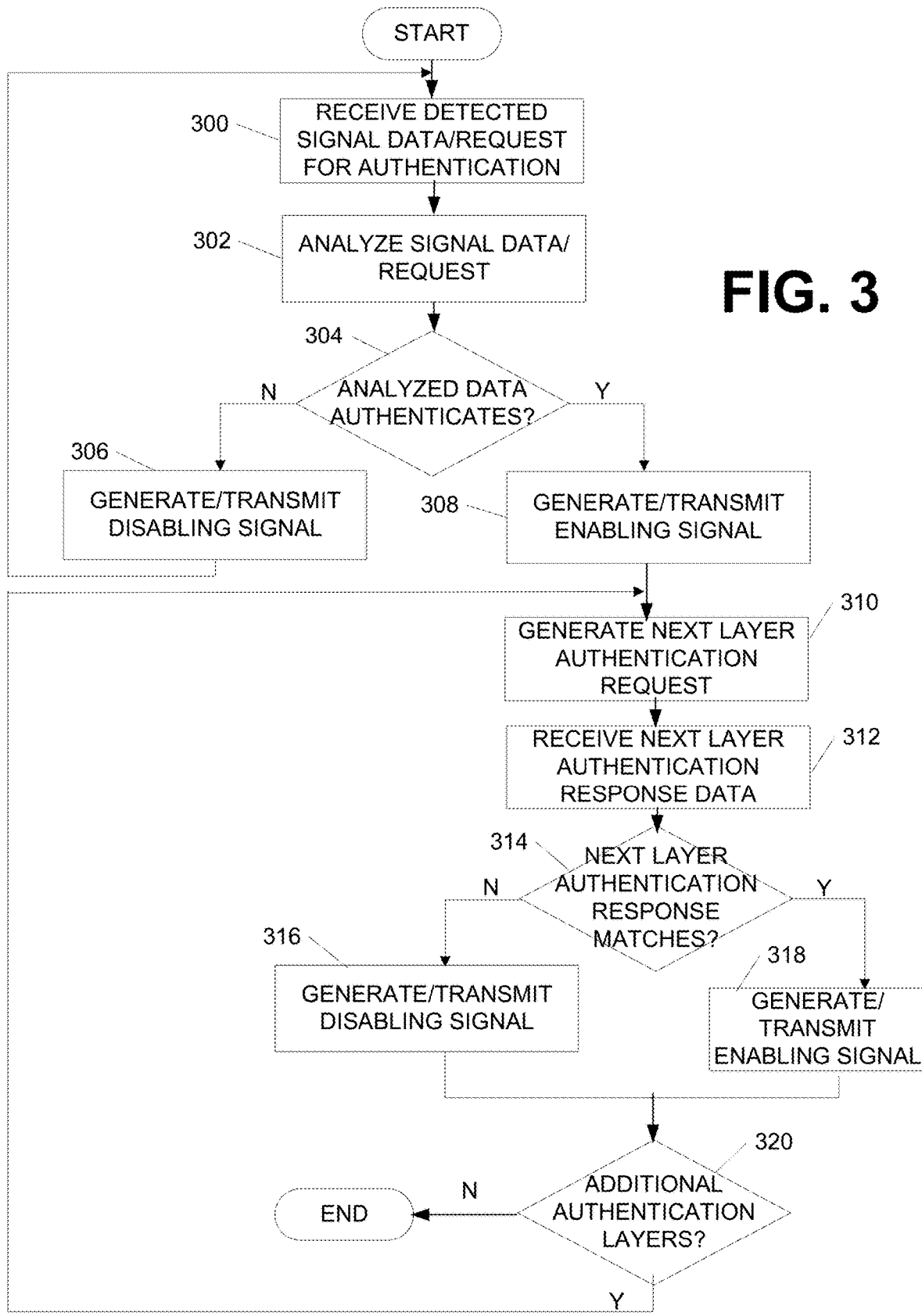

MULTI-LAYER AUTHENTICATION SYSTEM WITH SELECTIVE LEVEL ACCESS CONTROL

BACKGROUND

Aspects of the disclosure relate to electrical computers, systems, and authentication functions. In particular, one or more aspects of the disclosure relate to providing multi-layer authentication with selective level access control.

Protecting user data, personal finances, and thwarting unauthorized activity are priorities for users today. As users are conducting transactions, accessing buildings, and the like, authentication is used to confirm that the user is not, in fact, unauthorized. However, conventional devices used in these scenarios often have data printed on them which is readily available for use by an unauthorized user should the unauthorized user gain access to the device. Further, in some conventional arrangements, access to printed data on a device may be sufficient to perform any number of functions associated with the device, without limit. Accordingly, it would be advantageous to provide multi-layer authentication to control visible data while providing selective level access control.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with authentication of users or devices, preventing unauthorized activity, and the like.

In some examples, a system, computing platform, or the like, may receive data associated with a signal detected by a computing device. In some examples, the signal may be emitted from a smart processing device. The signal data may include a frequency of the signal. The received signal data may be compared to pre-stored signal data to determine whether a match exists. If not, an instruction or signal disabling functionality of the smart processing device may be generated and transmitted to the smart processing device. If so, an instruction or signal enabling functionality of the smart processing device may be generated and transmitted. In some examples, the instruction or signal enabling functionality may include causing display of one or more data elements on the smart processing device.

In some arrangements, the system, computing platform, or the like, may generate a request for next layer authentication data. The request may be transmitted to one or more computing devices and next layer authentication response data may be received. The next layer authentication response data may be compared to pre-stored next layer authentication data to determine whether a match exists. If not, an instruction or signal disabling functionality of the smart processing device may be generated and transmitted. If so, an instruction or signal enabling additional functionality of the smart processing device may be generated and transmitted.

In some examples, additional layers of authentication may be used to fully enable functionality of the smart processing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing multi-layer authentication and selective level access control functions in accordance with one or more aspects described herein;

FIG. 3 depicts an illustrative method for implementing and using a system to perform multi-layer authentication and selective level access control functions, according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to multi-layer authentication and selective level access control.

As mentioned above, protecting user data, user payment devices, and the like, is a top priority for many people. As the number of ways transactions are processed increases, the likelihood of an unauthorized user obtaining payment information increases. Accordingly, it is advantageous to provide innovative ways of authenticating users and devices in order to thwart unauthorized actors.

Accordingly, aspects described herein are directed to providing multi-layer authentication and selective level access control. In some examples, a smart processing device, such as a debit card, credit card, mobile payment device, wearable device, radio frequency identification device, and the like, may be used to process transactions, access a restricted area, or the like. The multi-layer authentication and selective access control arrangements described herein provide for one or more different layers of authentication that enable one or more different functions of the smart processing device, display one or more data elements on the smart processing device, and the like.

These and various other arrangements will be discussed more fully below.

Figure 1A:
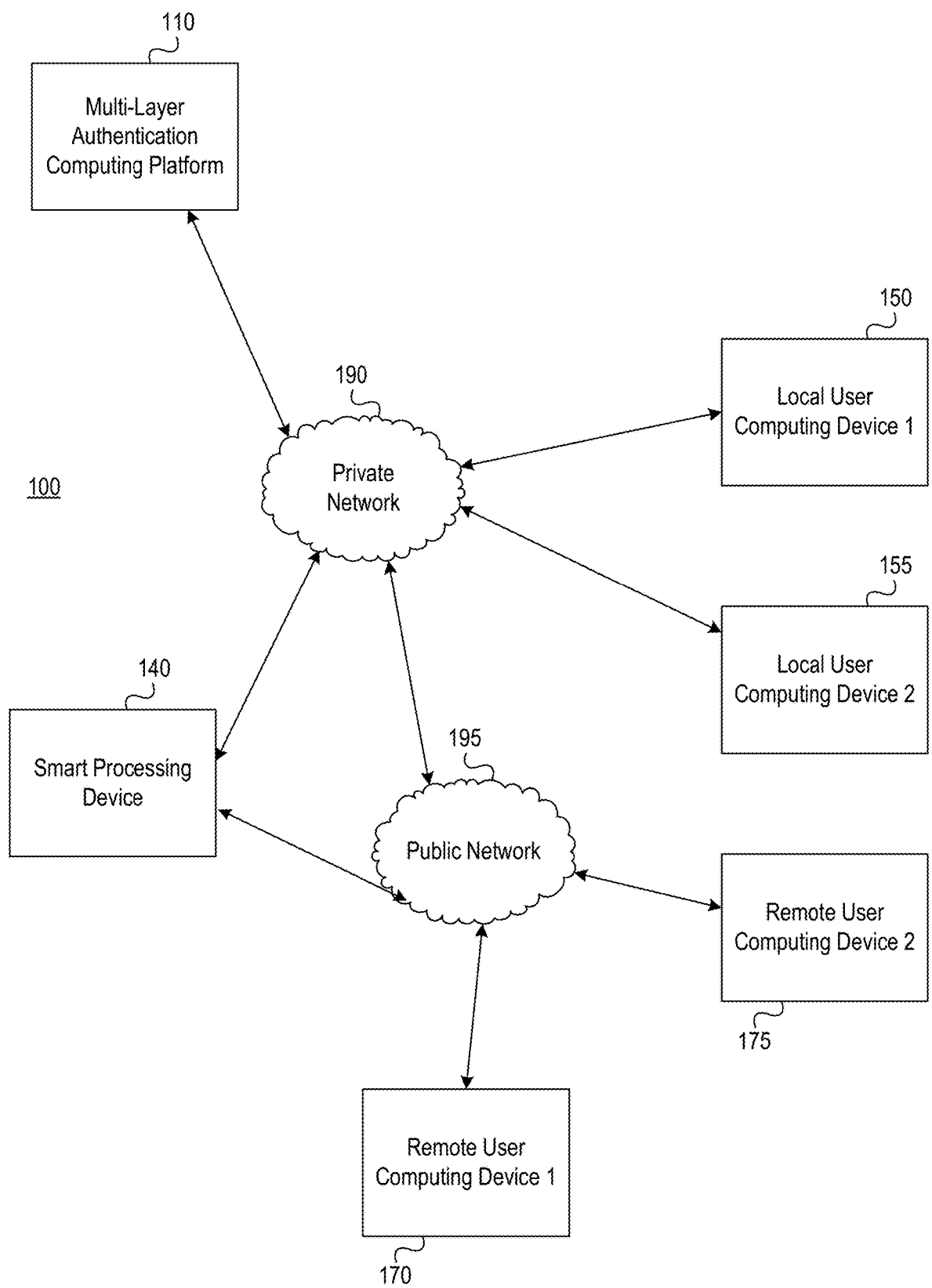
FIGS. 1A and 1B depict an illustrative computing environment for implementing multi-layer authentication and selective level access control functions in accordance with one or more aspects described herein.
Figure 1B:
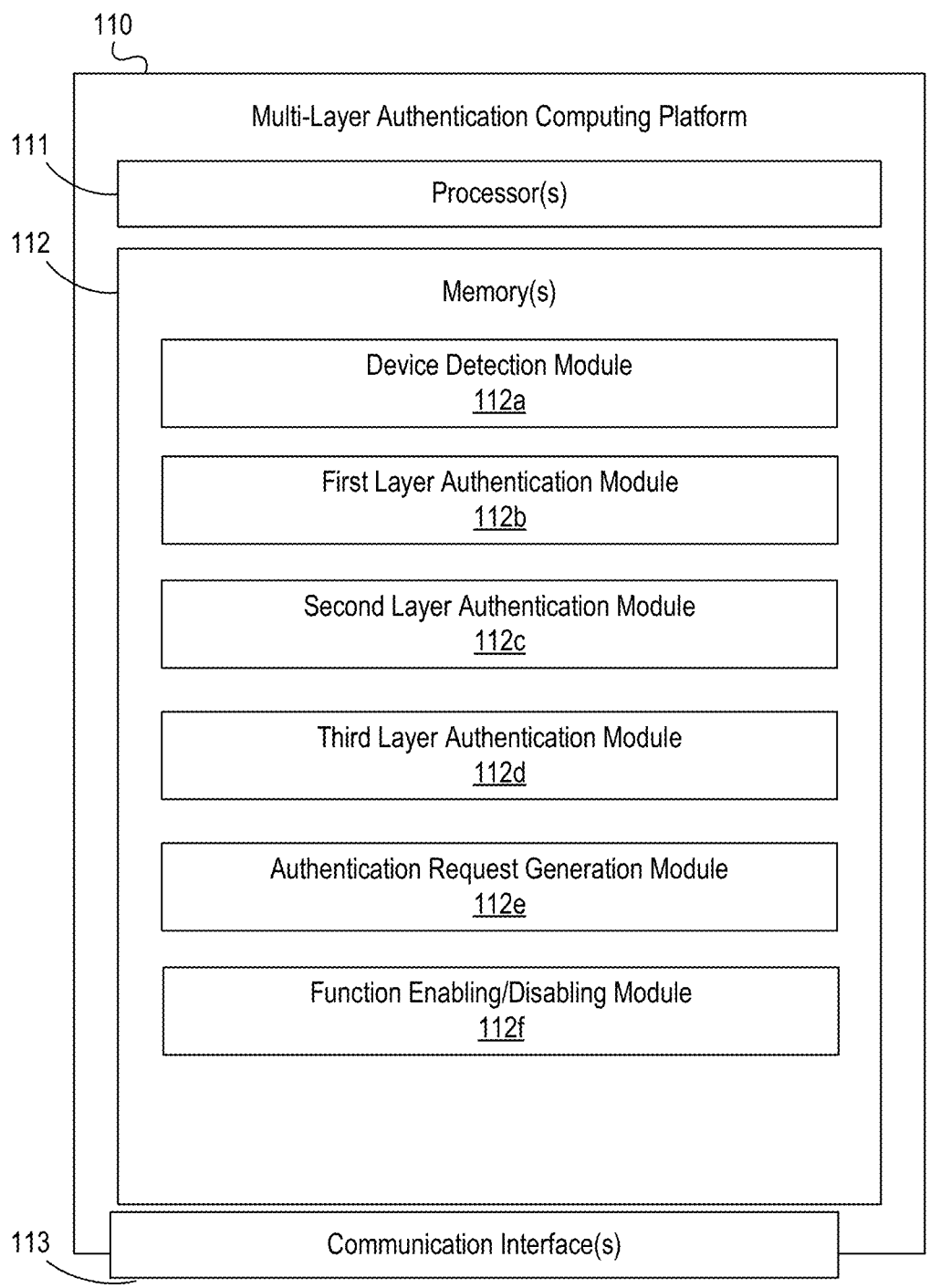

FIGS. 1A and 1B depict an illustrative computing environment for implementing and using a system for multi-layer authentication and selective level access control in accordance with one or more aspects described herein. Referring to FIG. 1A, computing environment 100 may include one or more computing devices and/or other computing systems. For example, computing environment 100 may include multi-layer authentication computing platform 110, smart payment device 140, a first local user computing device 150, a second local user computing device 155, a first remote user computing device 170, and a second remote user computing device 175.

Multi-layer authentication computing platform 110 may be to provide intelligent, dynamic multi-layer authentication and selective level access control functions. For instance, may, in some examples, receive an indication that a device, such as an automated teller machine, sensor within a building, or the like, has detected a signal from a device, such as a payment device. In some examples, the signal may be detected via near-field communication (e.g., the payment device is within a predetermined proximity of the sensing device), Bluetooth, radio frequency identification, and the like.

Upon receiving the indication, the multi-layer authentication computing platform 110 may analyze the received indication which, in some examples, may include the received or detected signal, a frequency of the signal, or the like. The multi-layer authentication computing platform 110 may evaluate the received data (e.g., frequency of a signal) to determine whether it matches pre-stored first level authentication data. If not, the multi-layer authentication computing platform 110 may generate a signal or instruction disabling one or more functions of the payment device (e.g., preventing the payment device from being used to conduct transactions, enter a building, or the like). The instruction or signal may be transmitted to the payment device and may be executed.

If the received data matches the pre-stored first layer authentication data, an instruction or signal may be generated enabling one or more functions of the payment device, causing display of one or more data elements on the payment device, or the like. For instance, a payment device may be blank prior to detection by the device (e.g., may have a smooth front and/or back surface, may include no markings indicating a user of the device, account number, expiration data, issue date, magnetic strip, or the like). The instruction or signal enabling functionality may include an instruction or signal to display one or more data elements (e.g., a name and/or an account number). Accordingly, some data may be visible but not all data might be visible after the first level of authentication is performed. Thus, the card may be used for certain functions but not others. Further, in some examples, the magnetic strip may be activated and/or a chip may be activated but might be enabled for use in only certain arrangements (e.g., for transactions less than a predetermined amount).

The multi-layer authentication computing platform 110 may generate a request for second or next layer authentication data. The request may include a request for one or more of a password, biometric data, detection of an additional device (e.g., wearable device, mobile device), input of a passcode transmitted to a mobile device, or the like. The request may be transmitted to, for instance, the device detecting the signal of the payment device, a mobile device of the user, or the like. The device detecting the signal, the mobile device, or the like, may receive second layer authentication response data and may transmit the second layer response data to the multi-layer authentication computing platform 110.

The multi-layer authentication computing platform 110 may analyze the second layer authentication response data to determine whether it matches pre-stored second layer authentication data. If not, a signal or instruction may be generated and transmitted to the payment device disabling functionality (e.g., removing from display the one or more data elements displayed in response to the first layer authentication data), or otherwise preventing the payment device from being used to conduct transactions.

If second layer authentication response data matches pre-stored data, an instruction or signal may be generated enabling additional functions (e.g., previously disabled functions) of the payment device, causing display of additional data elements, or the like.

In some examples, the multi-layer authentication computing platform 110 may generate a request for third or next layer authentication data. The request may include a request for one or more of a password, biometric data, detection of an additional device (e.g., wearable device, mobile device), input of a passcode transmitted to a mobile device, or the like. In some examples, the request may include a request for one or more of the above types of data that was not requested in the second layer authentication process. The request may be transmitted to, for instance, the device detecting the signal of the payment device, a mobile device of the user, or the like. In some examples, the request may be transmitted to a device other than the device to which the second layer authentication data request was transmitted. The device detecting the signal, the mobile device, or the like, may receive third layer authentication response data and may transmit the third layer response data to the multi-layer authentication computing platform 110.

The multi-layer authentication computing platform 110 may analyze the third layer authentication response data to determine whether it matches pre-stored third layer authentication data. If not, a signal or instruction may be generated and transmitted to the payment device disabling functionality (e.g., removing from display the one or more data elements displayed in response to the first layer authentication data), or otherwise preventing the payment device from being used to conduct transactions.

If third layer authentication response data matches pre-stored data, an instruction or signal may be generated enabling additional functions (e.g., previously disabled functions) of the payment device, causing display of additional data elements, or the like.

Smart processing device 140 may be any type of device used to process events, such as a payment device (e.g., credit or debit card) used to conduct transactions, a radio frequency identification (RFID) card used to enter a restricted area or building, a wearable device, a mobile device of a user, or the like. In some examples, smart processing device may include a microprocessor, memory, and the like. Smart processing device 140 may include regions in which one or more data elements may be displayed upon authentication (e.g., via light emitting diodes (LEDs) based on authentication data. Smart processing device 140 may be configured to transmit a signal (in some examples, at a particular frequency) that may be detected by another device (e.g., ATM, self-service kiosk, RFID pad on a building, or the like) to begin an authentication process, provide first layer authentication data, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the multi-layer authentication computing platform 110 to control parameters of the system, update or execute rules, modify settings, display notifications, and the like. Additionally or alternatively, local user computing device 150, 155 may be an ATM or other self-service kiosk at which a user is attempting to process a transaction.

The remote user computing devices 170, 175 may be used to communicate with, for example, multi-layer authentication computing platform 110. For instance, remote user computing devices 170, 175 may include user computing devices, such as mobile devices including smartphones, tablets, laptop computers, wearable devices, and the like, that may be used to communicate with multi-layer authentication computing platform 110, display requests for authentication data, receive authentication response data, generate a signal providing authentication response data, and the like. In some examples, remote user computing device 170, 175 may be a device at a building or other secure site to which a user is attempting to gain access that may detect a signal from smart processing device 140 in order to initiate authentication, provide first layer authentication data, and the like.

In one or more arrangements, smart processing device 140, local user computing device 150, local user computing device 155, remote user computing device 170, and/or remote user computing device 175 may be any type of computing device or combination of devices configured to perform the particular functions described herein. For example, smart processing device 140, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of smart processing device 140, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include multi-layer authentication computing platform 110. As illustrated in greater detail below, multi-layer authentication computing platform 110 may include one or more computing devices configured to perform one or more of the functions described herein. For example, multi-layer authentication computing platform 110 may include one or more computers (e.g., laptop computers, desktop computers, servers, server blades, or the like).

As mentioned above, computing environment 100 also may include one or more networks, which may interconnect one or more of multi-layer authentication computing platform 110, smart processing device 140, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, multi-layer authentication computing platform 110, local user computing device 150, local user computing device 155, and, in some examples, smart processing device 140, may be associated with an organization (e.g., a financial institution), and private network 190 may be associated with and/or operated by the organization, and may include one or more networks (e.g., LANs, WANs, virtual private networks (VPNs), or the like) that interconnect multi-layer authentication computing platform 110, local user computing device 150, local user computing device 155, and, in some examples, smart processing device 140, and one or more other computing devices and/or computer systems that are used by, operated by, and/or otherwise associated with the organization. Public network 195 may connect private network 190 and/or one or more computing devices connected thereto (e.g., multi-layer authentication computing platform 110, local user computing device 150, local user computing device 155, and, in some examples, smart processing device 140) with one or more networks and/or computing devices that are not associated with the organization. For example, remote user computing device 170, remote user computing device 175, and, in some examples, smart processing device 140, might not be associated with an organization that operates private network 190 (e.g., because remote user computing device 170, remote user computing device 175, and, in some examples, smart processing device 140, may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170, remote user computing device 175, and, in some examples, smart processing device 140, to private network 190 and/or one or more computing devices connected thereto (e.g., multi-layer authentication computing platform 110, local user computing device 150, local user computing device 155, and, in some examples, smart processing device 140).

Referring to FIG. 1B, multi-layer authentication computing platform 110 may include one or more processors 111, memory 112, and communication interface 113. A data bus may interconnect processor(s) 111, memory 112, and communication interface 113. Communication interface 113 may be a network interface configured to support communication between multi-layer authentication computing platform 110 and one or more networks (e.g., private network 190, public network 195, or the like). Memory 112 may include one or more program modules having instructions that when executed by processor(s) 111 cause multi-layer authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of multi-layer authentication computing platform 110 and/or by different computing devices that may form and/or otherwise make up multi-layer authentication computing platform 110.

For example, memory 112 may have, store and/or include a device detection module 112a. Device detection module 112a may store instructions and/or data that may cause or enable the multi-layer authentication computing platform 110 to receive data associated with detection of a device, such as smart processing device 140, and analyze the data. In some examples, the data may include a frequency of a signal emitted by the smart processing device 140. In some arrangements, the data may further include information associated with the smart processing device 140, such as a user associated with the device, an account associate with the device, and the like. The data may be received from one or more of local user computing device 150, 155, remote user computing device 170, 175, or the like.

Multi-layer authentication computing platform 110 may further have, store and/or include a first layer authentication module 112b. First layer authentication module 112b may store instructions and/or data that may cause or enable the multi-layer authentication computing platform 110 to evaluate the analyzed data received from, for example, device detection module, and compare the data to pre-stored first layer authentication data. For instance, a frequency of a signal emitted from a smart processing device 140 may be compared to pre-stored frequencies to determine whether the emitted and received frequency is an expected frequency for that smart processing device 140.

Multi-layer authentication computing platform 110 may further have, store and/or include a second layer authentication module 112c. Second layer authentication module 112c may store instructions and/or data that may cause or enable the multi-layer authentication computing platform 110 to receive second layer authentication response data and compare the data to pre-stored authentication data.

Multi-layer authentication computing platform 110 may further have, store and/or include a third layer authentication module 112d. Third layer authentication module 112d may store instructions and/or data that may cause or enable the multi-layer authentication computing platform 110 to receive third layer authentication response data and compare the third layer authentication response data to pre-stored third layer authentication data.

Although three layers of authentication and third layers of authentication modules are shown and described, more or fewer layers of authentication may be used without departing from the invention.

Multi-layer authentication computing platform 110 may further have, store and/or include authentication request generation module 112e. Authentication request generation module 112e may store instructions and/or data that may cause or enable the multi-layer authentication computing platform 110 to generate one or more requests for authentication data (e.g., second layer authentication data, third layer authentication data, and the like). In some examples, the authentication request generation module 112e may generate a request for authentication data in response to receiving, for instance, a detected signal, and indication that a previous layer of authentication has been completed, or the like.

Multi-layer authentication computing platform 110 may further have, store, and/or include function enabling/disabling module 112f. Function enabling/disabling module 112f may store instructions and/or data that may cause or enable the multi-layer authentication computing platform 110 to generate and/or transmit instructions and/or signals enabling and/or disabling functions of the smart payment device. In some examples, the signals or instructions may permit or disable processing of transactions, access to a building, and the like. Additionally or alternatively, the instructions and/or signals may cause display (e.g., in some examples, illumination) or one or more data elements on the smart processing device 140. For instance, prior to detection by a device, the smart processing device 140 may include a front and back surface having few or no markings visible thereon. As authentication layers are evaluated, one or more data elements may be displayed on the smart processing device 140, such as name, account number, expiration data, issue date, CVV, magnetic strip and associated data, and the like.

FIGS. 2A-2G depict an illustrative event sequence for implementing and using multi-layer authentication and selective level control functions in accordance with one or more aspects described herein. The events shown in the illustrative event sequence are merely one example sequence and additional events may be added, or events may be omitted, without departing from the invention.

Figure 2A:
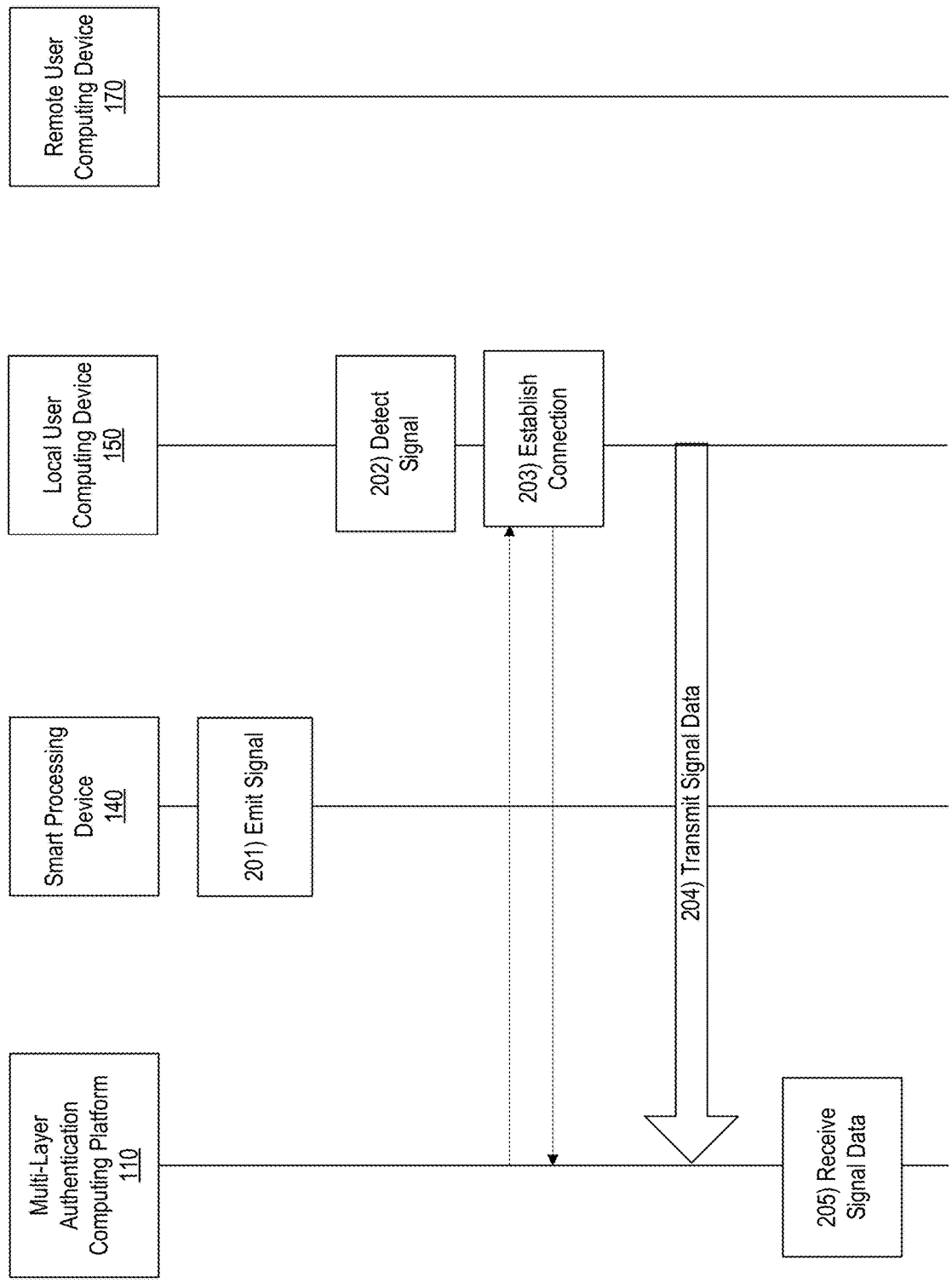

Referring to FIG. 2A, at step 201, a signal may be emitted from a device, such as smart processing device 140. In some examples, smart processing device 140 may be a payment device, such as a debit or credit card, a RFID card to access a restricted area or space, a wearable device, a mobile device of a user, or the like. In some examples, the signal may be emitted from the device in response to a request by a user (e.g., in anticipation of requesting a transaction, access, or the like). In other examples, the signal may be emitted continuously or on a periodic or aperiodic basis, as desired.

At step 202, the signal emitted from the smart processing device 140 may be detected by, for example, local user computing device 150. In some examples, local user computing device 150 may be an ATM, self-service kiosk, RFID pad to access a space, or the like. Although in the example shown the signal is detected by the local user computing device 150, in other examples, the signal may be detected by a remote user computing device, such as remote user computing device 170.

At step 203, a connection may be established between the local user computing device 150 and the multi-layer authentication computing platform 110. For instance, a first wireless connection may be established between the local user computing device 150 and the multi-layer authentication computing platform 110. Upon establishing the first wireless connection, a communication session may be initiated between the multi-layer authentication computing platform 110 and the local user computing device 150.

At step 204, data associated with the received signal may be transmitted from the local user computing device 150 to the multi-layer authentication computing platform 110. For instance, data such as the signal, a detected frequency of the signal, data associated with the smart processing device 140, with a user of the smart processing device 140, and the like, may be transmitted from the local user computing device 150 to the multi-layer authentication computing platform 110. In some examples, the data may be transmitted during the communication session establishing upon initiating the first wireless connection.

At step 205, the signal data may be received by the multi-layer authentication computing platform 110.

Figure 2B:
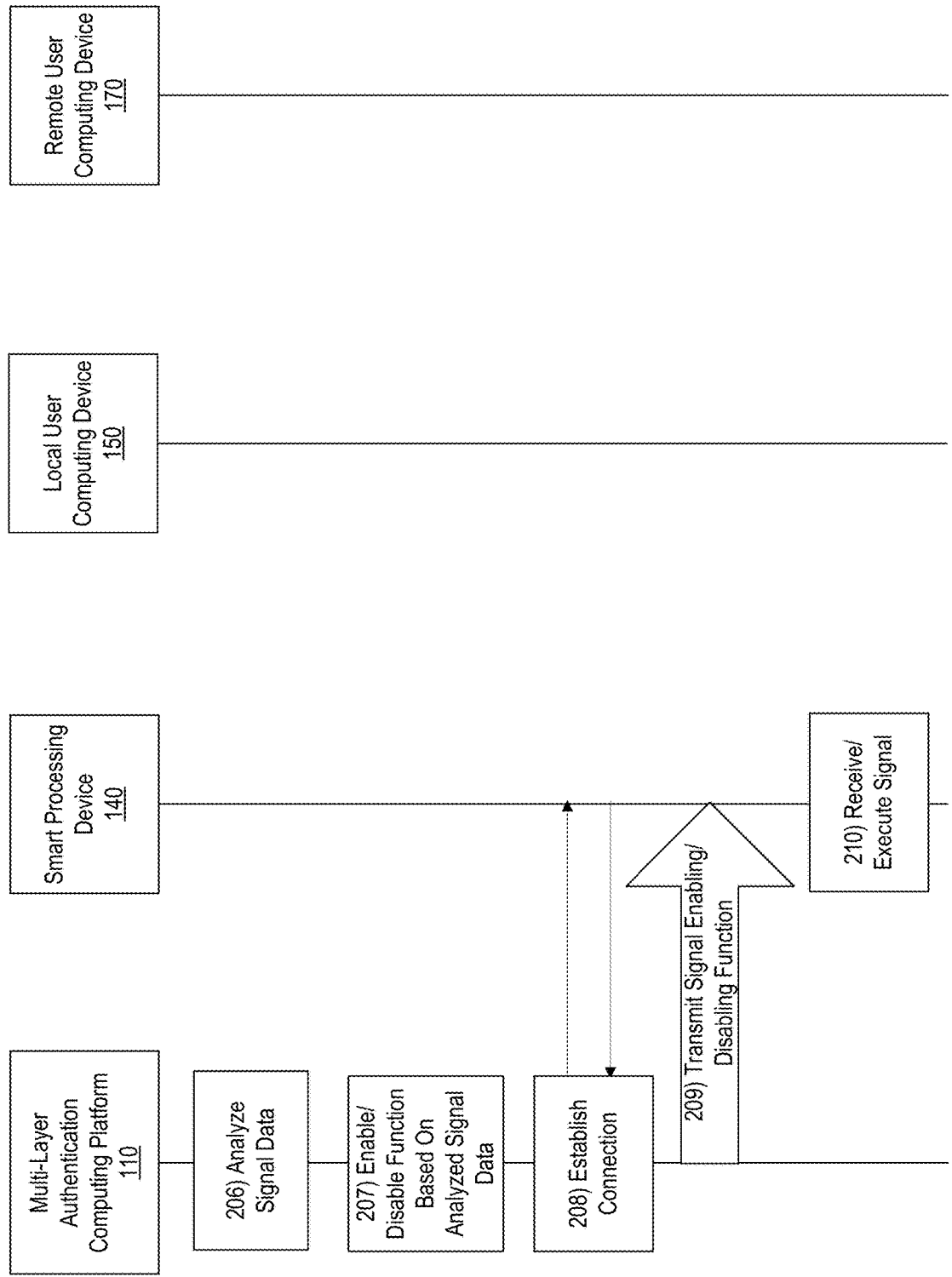

With reference to FIG. 2B, at step 206, the received signal data may be analyzed by the multi-layer authentication computing platform 110. For instance, the received signal data may be analyzed to determine a frequency of the signal received. The identified frequency may then be compared to pre-stored signal data (e.g., a pre-stored frequency associated with the smart processing device 140) to determine whether the received signal data matches the pre-stored signal data. In some examples, comparing the received signal data to pre-stored signal data may constitute a first layer of authentication of the smart processing device 140.

At step 207, an instruction or signal enabling or disabling functionality of the smart processing device 140 may be generated. For instance, based on the analysis in step 206, if the received signal data does not match the pre-stored signal data, an instruction or signal disabling functionality of the smart processing device 140 may be generated. For instance, the signal or instruction may disable any functionality and may cause the smart processing device 140 to be unavailable for use in one or more scenarios (e.g., prevent the smart processing device from being used to process transactions, prevent the smart processing device 140 from being used to access an area, or the like).

If the received signal data does match the pre-stored signal data, an instruction or signal enabling one or more functions and or causing display of one or more data elements may be generated. For instance, as discussed herein, the smart processing device 140 may be a blank device with few or no identifying marking thereon (e.g., prior to enabling of functionality based on authentication). If the received data matches the pre-stored data, the instruction or signal generated may enable some functionality of the device (e.g., a first set of functions that are limited because only one layer of authentication has been performed) and/or may cause one or more data elements to be displayed (e.g., illuminate or otherwise display a name, account number, or the like). At step 207, less than all of the data associated with the smart processing device 140 will be displayed after authentication (e.g., further authentication may be required prior to displaying more data elements, all data elements, or the like).

At step 208, a connection may be established between the multi-layer authentication computing platform 110 and the smart processing device 140. For instance, a second wireless connection may be established between the multi-layer authentication computing platform 110 and the smart processing device 140. Upon establishing the second wireless connection, a communication session may be initiated between the multi-layer authentication computing platform 110 and the smart processing device 140.

At step 209, the generated signal may be transmitted from the multi-layer authentication computing platform 110 to the smart processing device 140. For instance, the instruction enabling or disabling functionality may be transmitted from the multi-layer authentication computing platform 110 to the smart processing device 140 during the communication session establishing upon initiating the second wireless connection.

At step 210, the instruction or signal may be received by the smart processing device 140 and executed by the device. Executing the signal or instruction may include enabling functionality, disabling functionality, causing display of one or more data elements, and the like.

With reference to FIG. 2C, at step 211, a request for second layer authentication data may be generated. In some examples, the request for second layer authentication may be generated automatically upon initial or first layer authentication (e.g., detected signal or signal properties matching pre-stored signal or signal properties). Additionally or alternatively, the request for second layer authentication may be generated in response to a user requesting functionality of the smart processing device that is not enabled based on the first layer authentication.

Second layer authentication data may include data different from the initial or first layer authentication data (e.g., signal detection, signal properties, or the like). For instance, second layer authentication data may include biometric data of a user (e.g., fingerprint, iris scan, voice print, or the like), username and password, personal identification number (PIN), detection of another device (e.g., mobile device of a user, wearable device of the user) within a predefined proximity of another device, input of a passcode or other alphanumeric string transmitted to a computing device of a user that is pre-registered with the system, or the like.

At step 212, a connection may be established between the multi-layer authentication computing platform 110 and the local user computing device 150. For instance, a third wireless connection may be established between the multi-layer authentication computing platform 110 and the local user computing device 150. Upon establishing the third wireless connection, a communication session may be initiated between the multi-layer authentication computing platform 110 and the local user computing device 150.

Although the request for second layer authentication data is shown as being transmitted to local user computing device 150 in FIG. 2C, in some examples, the request may be transmitted to another computing device, such as a mobile computing device associated with a user (e.g., remote user computing device 170). In some examples, the request for second layer authentication data may be transmitted to the device that detected the smart processing device 140 signal.

At step 213, the generated request for second layer authentication data may be transmitted from the multi-layer authentication computing platform 110 to the local user computing device 150. For instance, the generated request may be transmitted from the multi-layer authentication computing platform 110 to the local user computing device 150 during the communication session establishing upon initiating the third wireless connection.

At step 214, the request for second layer authentication data may be received by the local user computing device 150 and, at step 215, the request for second layer authentication data may be displayed on a display of the local user computing device 150.

Figure 2D:
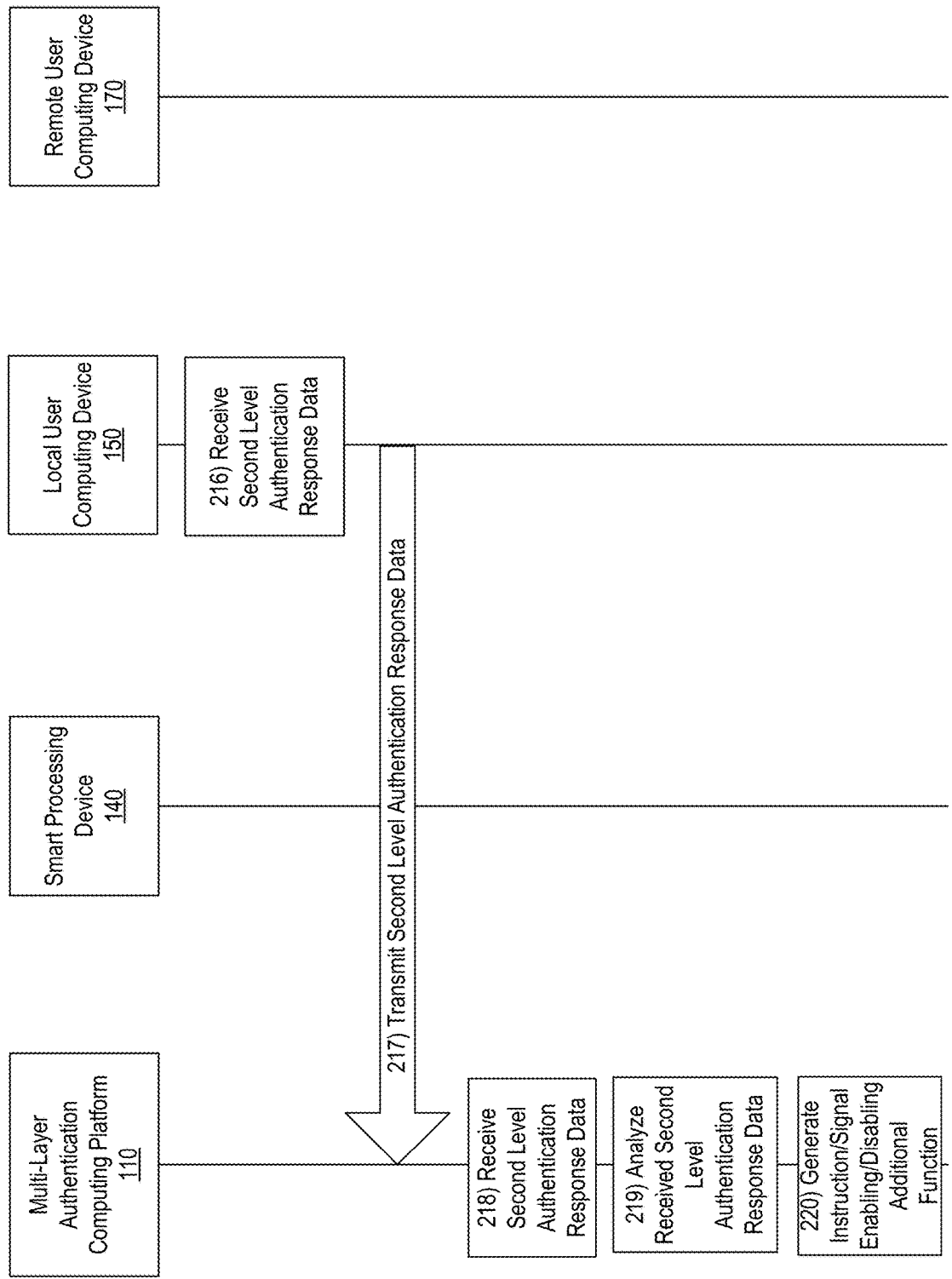

With reference to FIG. 2D, at step 216, second layer authentication response data may be received by the computing device to which the request was transmitted. For instance, second layer authentication response data may be received by the local user computing device 150. In some examples, the second layer authentication response data may include user input provided by a user requesting functionality, using the smart processing device 140, or the like. For instance, second layer authentication data may include a username and password of a user requesting functionality of the smart processing device 140.

At step 217, the second layer authentication response data may be transmitted from the local user computing device 150 to the multi-layer authentication computing platform 110. At step 218, the second layer authentication response data may be received by the multi-layer authentication computing platform 110.

At step 219, the second layer authentication response data may be analyzed and/or evaluated. For instance, the second layer authentication response data may be compared to pre-stored second layer authentication data to determine whether a match exists. In some examples, the pre-stored second layer authentication data (and, for example, the first or initial layer authentication data and/or other subsequent layers of authentication data) may be provided and stored during a registration process.

At step 220, an instruction or signal enabling or disabling one or more functions of the smart processing device 140 may be generated by the multi-layer authentication computing platform 110. For instance, based on the analysis in step 219, if the received second layer authentication response data does not match the pre-stored second layer response data, an instruction or signal disabling functionality of the smart processing device 140 may be generated. For instance, the signal or instruction may disable any functionality (or functionality previously enabled), cause previously displayed data elements to no longer be displayed, and/or may cause the smart processing device 140 to be unavailable for use in one or more scenarios (e.g., prevent the smart processing device from being used to process transactions, prevent the smart processing device 140 from being used to access an area, or the like). In some examples, if the second layer authentication response data does not match pre-stored second layer authentication data, functionality previously enabled (and/or data elements previously displayed) may remain enabled (or displayed) but no additional functionality may be enabled and/or no additional data elements may be displayed.

If the received second layer authentication response data does match the pre-stored second layer authentication data, an instruction or signal enabling one or more functions additional and or causing display of one or more additional data elements may be generated. For instance, the smart processing device 140 may have some limited functionality and/or may have some but not all data elements displayed based on the initial layer of authentication. If the received second layer authentication response data matches the pre-stored second layer authentication data, the instruction or signal generated may enable additional functionality of the smart processing device 140 (e.g., a second set of functions that are limited because only two layers of authentication has been performed but that includes the first set of functions enabled based on the first layer of authentication as well as additional functions not previously available) and/or may cause one or more additional data elements to be displayed (e.g., illuminate or otherwise display an expiration data or other data in addition to the a name, account number, or the like displayed based on the initial layer of authentication). In some examples, based on the second layer of authentication response data matching the pre-stored second layer authentication data, less than all of the data associated with the smart processing device 140 will be displayed after authentication (e.g., further authentication may be required prior to displaying more data elements, all data elements, or the like). Alternatively, in examples in which only two layers of authentication are used, all data elements may be displayed and/or all functionality may be enabled.

With reference to FIG. 2E, at step 221, a connection may be established between the multi-layer authentication computing platform 110 and the smart processing device 140. For instance, a fourth wireless connection may be established between the multi-layer authentication computing platform 110 and the smart processing device 140. Upon establishing the fourth wireless connection, a communication session may be initiated between the multi-layer authentication computing platform 110 and the smart processing device 140.

At step 222, the generated signal or instruction (e.g., based on analyzing the second layer authentication response data) may be transmitted from the multi-layer authentication computing platform 110 to the smart processing device 140. For instance, the instruction enabling or disabling functionality based on analysis of the second layer authentication response data may be transmitted from the multi-layer authentication computing platform 110 to the smart processing device 140 during the communication session establishing upon initiating the fourth wireless connection.

At step 223, the instruction or signal may be received by the smart processing device 140 and executed by the device. Executing the signal or instruction may include enabling functionality, disabling functionality, causing display of one or more data elements, and the like.

At step 224, a request for third or next layer authentication data may be generated by the multi-layer authentication computing platform 110. In some examples, the request for third layer authentication may be generated automatically upon second or immediately prior layer authentication (e.g., second layer authentication response data matching pre-stored second layer authentication data). Additionally or alternatively, the request for third layer authentication may be generated in response to a user requesting functionality of the smart processing device 140 that is not enabled based on the first or second layer authentication.

In some examples, third layer authentication data may include biometric data of a user (e.g., fingerprint, iris scan, voice print, or the like), username and password, personal identification number (PIN), detection of another device (e.g., mobile device of a user, wearable device of the user) within a predefined proximity of another device, input of a passcode or other alphanumeric string transmitted to a computing device of a user that is pre-registered with the system, or the like. In some examples, third layer authentication data may include data different from the first and/or second layer authentication data. For instance, if second layer authentication data included a username and password, third layer authentication data may include one or more types of biometric data. In another example, if the second layer authentication data included a biometric data, the third layer authentication data may include a passcode or other alphanumeric string transmitted to a pre-registered computing device of the user. Accordingly, in at least some examples, each layer of authentication may include different types of data that other layers of authentication.

At step 225, a connection may be established between the multi-layer authentication computing platform 110 and the remote user computing device 170. For instance, a fifth wireless connection may be established between the multi-layer authentication computing platform 110 and the remote user computing device 170. Upon establishing the fifth wireless connection, a communication session may be initiated between the multi-layer authentication computing platform 110 and the remote user computing device 170.

Although the request for third layer authentication data is shown as being transmitted to remote user computing device 170 in FIG. 2E, in some examples, the request may be transmitted to another computing device, such as local user computing device 150. In some examples, the request for third layer authentication data may be transmitted to the device that detected the smart processing device 140 signal. Additionally or alternatively, the request for third layer authentication data may be transmitted to a different computing device than the one that detected the signal emitted from smart processing device 140.

With reference to FIG. 2F, at step 226, the generated request for third layer authentication data may be transmitted from the multi-layer authentication computing platform 110 to the remote user computing device 170. For instance, the generated request may be transmitted from the multi-layer authentication computing platform 110 to the remote user computing device 170 during the communication session establishing upon initiating the fifth wireless connection.

At step 227, the request for third or next layer authentication data may be received by the remote user computing device 170 and may be displayed on a display of the remote user computing device 170.

At step 228, third or next layer authentication response data may be received by the computing device to which the request was transmitted. For instance, third or next layer authentication response data may be received by the remote user computing device 170. In some examples, the third layer authentication response data may include user input provided by a user requesting functionality, using the smart processing device 140, or the like.

At step 229, the third or next layer authentication response data may be transmitted from the remote user computing device 170 to the multi-layer authentication computing platform 110. At step 230, the third or next layer authentication response data may be received by the multi-layer authentication computing platform 110.

Figure 2G:
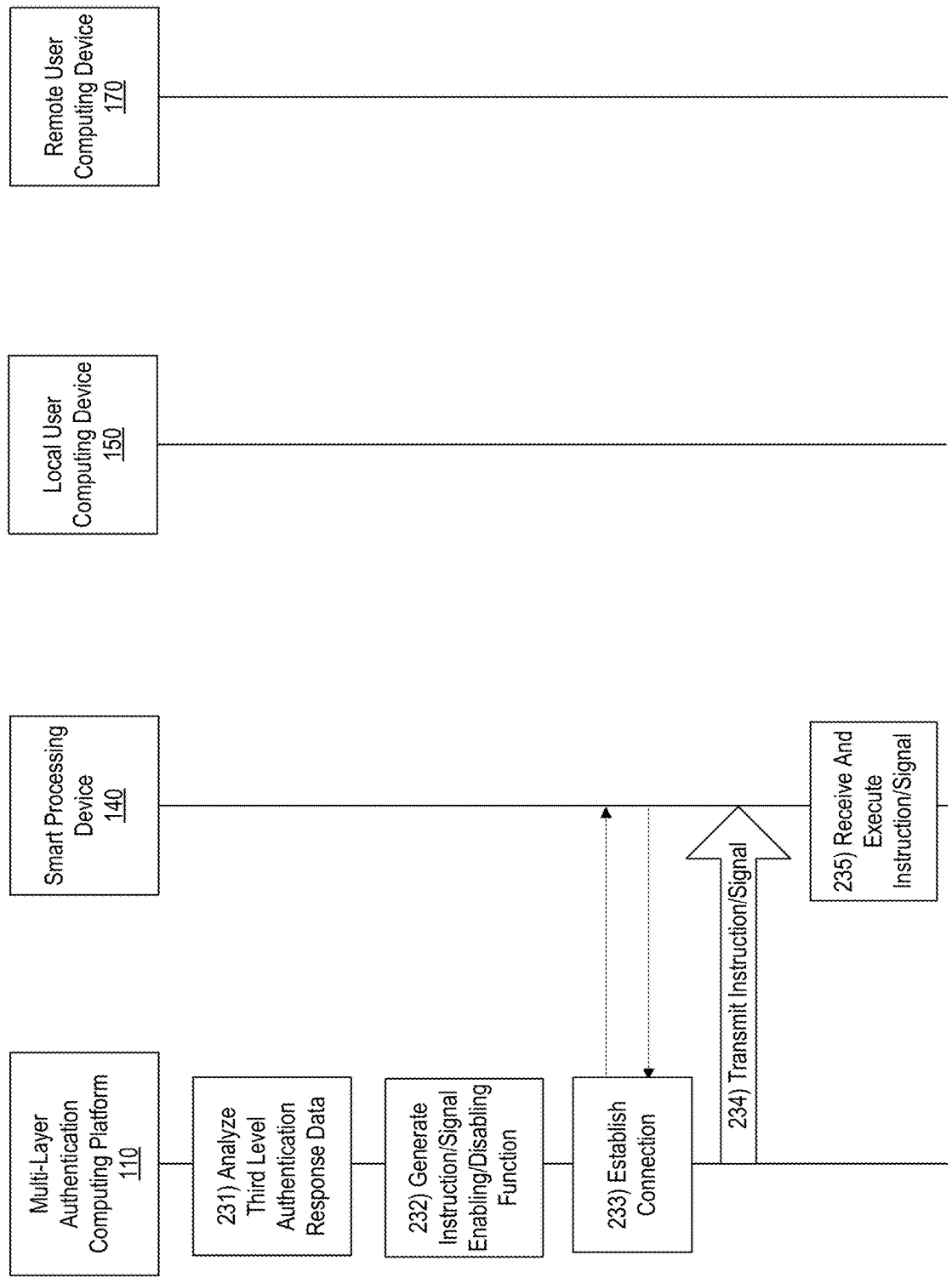

With reference to FIG. 2G, at step 231, the third or next layer authentication response data may be analyzed and/or evaluated. For instance, the third or next layer authentication response data may be compared to pre-stored third or next layer authentication data to determine whether a match exists.

At step 232, an instruction or signal enabling or disabling one or more functions of the smart processing device 140 may be generated by the multi-layer authentication computing platform 110. For instance, based on the analysis in step 231, if the received third or next layer authentication response data does not match the pre-stored second layer response data, an instruction or signal disabling functionality of the smart processing device 140 may be generated. For instance, the signal or instruction may disable any functionality (or functionality previously enabled), cause previously displayed data elements to no longer be displayed, and/or may cause the smart processing device 140 to be unavailable for use in one or more scenarios (e.g., prevent the smart processing device from being used to process transactions, prevent the smart processing device 140 from being used to access an area, or the like). In some examples, if the third or next layer authentication response data does not match pre-stored third or next layer authentication data, functionality previously enabled (and/or data elements previously displayed) may remain enabled (or displayed) but no additional functionality may be enabled and/or no additional data elements may be displayed.

If the received third layer authentication response data does match the pre-stored third layer authentication data, an instruction or signal enabling one or more additional functions and or causing display of one or more additional data elements may be generated. For instance, the smart processing device 140 may have some limited functionality and/or may have some but not all data elements displayed based on the initial and second layer of authentication. If the received third or next layer authentication response data matches the pre-stored third or next layer authentication data, the instruction or signal generated may enable additional functionality of the smart processing device 140 (e.g., a third or next set of functions that includes the first and second sets of functions enabled based on the first and second layers of authentication as well as additional functions not previously available) and/or may cause one or more additional data elements to be displayed (e.g., illuminate or otherwise display a CVV code in addition to the expiration data or other data, name, account number, or the like displayed based on the initial and second layers of authentication). In some examples, based on the third or next layer of authentication response data matching the pre-stored third or next layer authentication data, all data associated with the smart processing device 140 may be displayed and/or all functionality may be enabled.

Although three layers of authentication are described herein, more of fewer layers may be used without departing from the invention. In examples in which more than three layers are used, the third layer of authentication may enable additional functionality or display additional data elements beyond those provided based on the first and second layers of authentication but still less than all functionality or data elements.

At step 233 a connection may be established between the multi-layer authentication computing platform 110 and the smart processing device 140. For instance, a sixth wireless connection may be established between the multi-layer authentication computing platform 110 and the smart processing device 140. Upon establishing the sixth wireless connection, a communication session may be initiated between the multi-layer authentication computing platform 110 and the smart processing device 140.

At step 234, the generated signal or instruction (e.g., based on analyzing the third or next layer authentication response data) may be transmitted from the multi-layer authentication computing platform 110 to the smart processing device 140. For instance, the instruction enabling or disabling functionality based on analysis of the third or next layer authentication response data may be transmitted from the multi-layer authentication computing platform 110 to the smart processing device 140 during the communication session establishing upon initiating the sixth wireless connection.

At step 235, the instruction or signal may be received by the smart processing device 140 and executed by the device. Executing the signal or instruction may include enabling functionality, disabling functionality, causing display of one or more data elements, and the like.

FIG. 3 is a flow chart illustrating one example method of providing multi-layer authentication and selective level control functions according to one or more aspects described herein. The processes illustrated in FIG. 3 are merely some example processes and functions. The steps shown may be performed in a different order, more steps may be added, or one or more steps may be omitted without departing from the invention.

At step 300, detected signal data and/or a request for first layer authentication may be received. For instance, in some examples, a device, such as an ATM, self-service kiosk, RFID pad on a building or restricted access area, point-of-sale device, or the like, may detect a signal emitted from a smart processing device 140. Data associated with the signal (e.g., a frequency of the signal, identifier of the smart processing device 140, user associated with the smart processing device 140, and the like) may be transmitted to and received by the multi-layer authentication computing platform 110. In some examples, the detected signal data may constitute a request for first layer authentication.

At step 302, the received signal data and/or request may be analyzed. For example, the received signal data may be compared to pre-stored signal data associated with authenticating the smart processing device 140. In some examples, the signal data analysis may include comparing a frequency of the signal received to a pre-stored (e.g., expected) frequency associated with the smart processing device 140.

At step 304, a determination may be made as to whether the analyzed data matches the pre-stored data. If not, a signal or instruction disabling functionality associated with the smart processing device 140 may be generated and transmitted to the smart processing device 140 at step 306. For instance, an instruction or signal preventing use of the smart processing device 140 may be generated and transmitted to the device 140.

If, at step 304, the analyzed data does match the pre-stored data, an instruction or signal enabling at least some functionality (e.g., a first subset of all functionality) of the smart processing device 140 may be generated and transmitted to the smart processing device 140 at step 308. For instance, in examples in which the smart processing device does not include any visible data (e.g., is generally blank in a first state), the generated instruction and/or signal may be an instruction or signal causing display (e.g., illumination in at least some examples) of one or more data elements on the smart processing device. Additionally or alternatively, the generated instruction or signal may enable use of a chip embedded in the smart processing device 140 for limited uses (e.g., transactions below a certain dollar amount, or the like).

At step 310, a next layer authentication request may be generated. For instance, the first layer authentication (e.g., comparing signal data to pre-stored data) may provide limited functionality of the smart processing device 140. However, additional functionality may be enabled based on additional layers of authentication. Accordingly, the next layer authentication request may include a request for biometric data, username and password, PIN, near-field detection of a wearable device or mobile device, or the like. The generated next layer authentication request may be transmitted to one or more computing devices, such as local user computing device 150, remote user computing device 170, or the like.

At step 312, next layer authentication response data may be received. For instance, one or more of biometric data, username and password, PIN, near-field detection of a wearable device or mobile device, or the like, may be received from a computing device. In some examples, the next layer authentication response data may be received from the device to which the next layer authentication data request was transmitted. Additionally or alternatively, the next layer authentication response data may be received from a device other than the device to which the next layer authentication request was transmitted (e.g., a request may be displayed by an ATM and user input may be received via a mobile device of a user).

At step 314, a determination is made as to whether the received next layer authentication response data matches pre-stored data. For instance, the received next layer authentication response data may be compared to pre-stored next layer authentication data to determine whether a match exists. If not, a signal or instruction may be generated and transmitted to the smart processing device 140 disabling functionality, preventing enabling of functionality or use of the device, or the like at step 316. In some examples, the instruction or signal may include an instruction or signal to disable functionality previously enabled based on the first layer authentication. In other examples, the instruction or signal may include an instruction or signal to maintain functionality provided based on the first layer of authentication but prevent enabling other functions.

If, at step 314, the received next layer authentication data does match pre-stored authentication data, an instruction or signal enabling additional functionality (e.g., a second subset of all functionality, the second subset including the first subset of functionality and additional functionality) may be generated and transmitted to the smart processing device at step 318. For instance, an instruction or signal causing display of additional data elements, enabling additional functionality (e.g., an increased limit for transactions, or the like), or the like, may be generated and transmitted to the smart processing device 140.

At step 320, a determination may be made as to whether additional authentication layers are available. For instance, if two authentication layers are needed to provide all functionality associated with the smart processing device 140, the process may end based on the determination in step 320. Alternatively, if additional layers of authentication are available to enable additional functionality associated with the smart processing device 140, the process may return to step 310 and a next layer authentication data request may be generated.

Figure 4A:
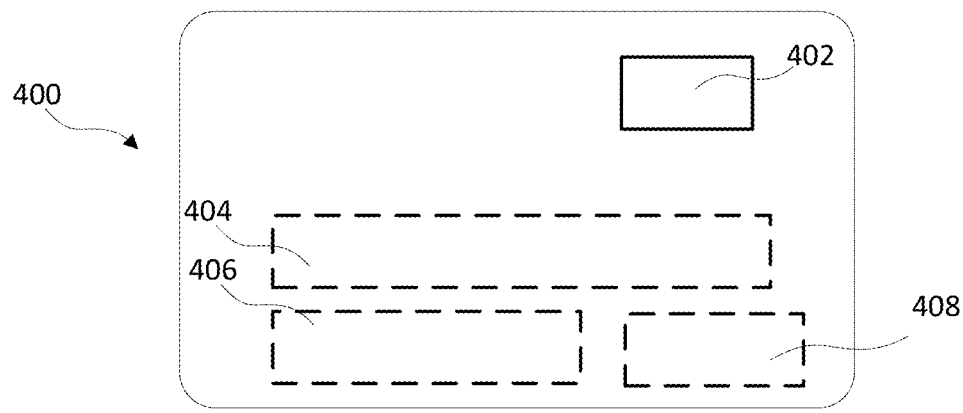
FIGS. 4A-4C illustrate an example smart processing device in different stages of enabled functionality in accordance with one or more aspects described herein.
Figure 4B:
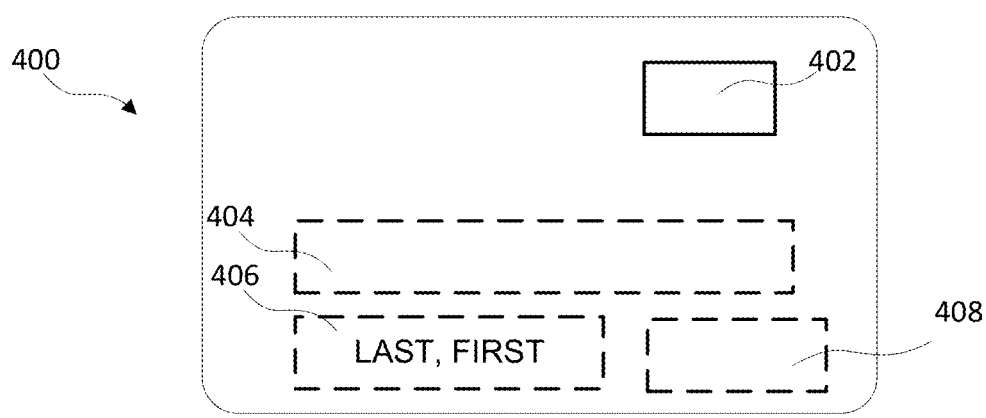
Figure 4C:
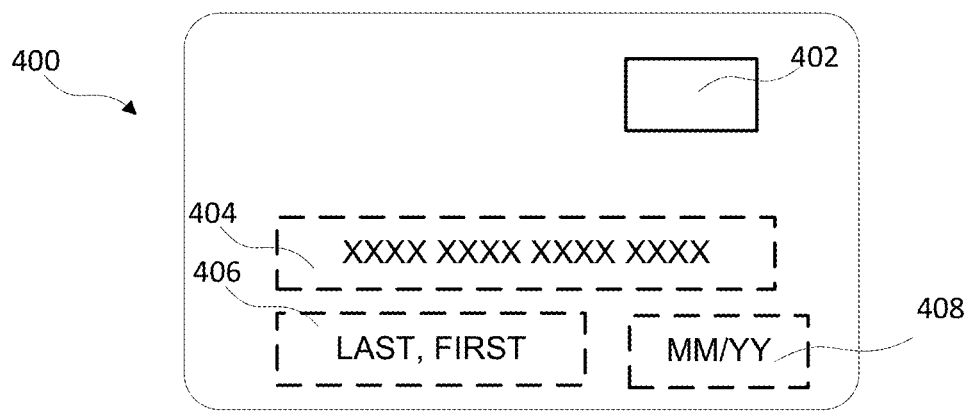

FIGS. 4A-4C illustrate a smart processing device 400 according to one or more aspects described herein. Smart processing device 400 may be a debit or credit card. However, various other smart processing devices may be used with the arrangements described herein without departing from the invention.

As shown in FIG. 4A, the smart processing device 400 may include an embedded chip 402 that may provide transaction processing functions. The smart processing device 400 may further include one or more data fields 404, 406, 408. As shown in FIG. 4A, the data fields may be generally blank. That is, no data may be visible in the data fields 404, 406, 408. In some examples, the device 400 may also have the embedded chip 402 disabled. Accordingly, should an unauthorized user obtain the smart processing device 400, it would be virtually useless as a chip is disabled, no data is visible thereon, or the like. The smart processing device 400 of FIG. 4A is shown prior to any authentication processes being performed (e.g., prior to signal detection or other first layer authentication being performed).

FIG. 4B illustrates the smart processing device 400 after a first layer of authentication has been performed. In some examples, the chip 402 may be enabled to perform at least limited functions (e.g., process transactions below a particular amount, or the like). Further, the first layer authentication may cause a data field to be displayed. For instance, name field 406 includes the displayed name of a user associated with smart processing device 400. Accordingly, the device 400 may be used to perform limited functions.

FIG. 4C illustrates the smart processing device 400 after a next layer authentication has been performed. As shown in FIG. 4C, data in all data fields may be displayed. For instance, an account number may be displayed in field 404, a name in field 406, an expiration date in field 408. Additional data fields may also be provided without departing from the invention. In some examples, the chip may also be enabled to perform additional functions beyond those available to the device 400 of FIG. 4B. In some examples, the smart processing device 400 of FIG. 4C may be fully enabled. In other examples, additional layers of authentication may be needed to provide additional functionality.

Aspects described herein provide improved authentication processes by providing multi-layer authentication and selective level access control. The arrangements described herein provide for limited functionality, data visibility, and the like, of a smart processing device, based on one or more different (e.g., separate or independent) layers of authentication. As discussed herein, in some examples, each layer of authentication data may include a different type of data. For instance, a first authentication layer may include evaluating a signal emitted from the smart processing device, a second authentication layer may include providing a username and/or password or PIN, a third layer may include providing biometric data, a fourth layer may include inputting a code or alphanumeric string transmitted to a pre-registered user device, and the like.

In some arrangements, the smart processing device may include a payment device such as a debit card, credit card, or the like. In some examples, the smart processing device may, prior to a first layer of authentication, be or appear blank (e.g., no user data, account data, or the like is visible on a surface (e.g., front or back) of the smart processing device). Accordingly, if the smart processing device is lost, misplaced, stolen, or the like, it is virtually unusable to a user other than an authorized user because no visible data is provided. As each layer of authentication is performed, additional data elements may be displayed, until all layers of authentication are provided causing all data elements to be displayed.

In some arrangements, a previous layer of authentication must be performed prior to performing a subsequent layer of authentication and enabling functionality associated with the subsequent layer. For instance, in some examples, a first layer must be performed prior to a second layer, prior to a third layer, and the like, such that functionality associated with the first layer is enabled prior to functionality associated with the second layer, prior to functionality associated with the third layer, and the like.

In some examples, additional, non-standard data elements may be displayed responsive to one or more layers of authentication. For instance, a name of a bank associated with the smart processing device or associated account may be provided, a nickname associated with the smart processing device or account may be provided, and the like.

In some examples, more than one layer of authentication may rely on signals emitted from the smart processing device. For instance, a first signal may be detected by a building and authenticated, while a second signal may be detected by an ATM and authenticated. Accordingly, in some examples, a combination of frequencies may be used to perform multiple layers of authentication.

Further, although many arrangements described herein are directed to a signal emitted from the smart processing device, in some examples, the signal may be emitted from another device and detected by the smart processing device. For instance, the smart processing device may be configured to awaken in response to detecting a signal of a certain frequency. The smart processing device may then continuously or periodically scan to attempt to detect a signal of the designated frequency.

In some arrangements, the smart processing device may include a silent mode. For instance, an instruction to cease emitting or scanning for a signal may be provided to the smart processing device. The instruction may be provided directly to the smart processing device (e.g., based on a pattern of contact with the smart processing device, an extended period of contact in a designated area on the device, or the like) or may be transmitted to the smart processing device via a user device (e.g., mobile device, wearable device, or the like). The smart processing device may then be unusable (e.g., all functionality completely disabled) until the silent mode is disabled. Accordingly, an unauthorized actor would be completely unable to use the smart processing device to process any transactions when in silent mode.

In some examples, upon detecting the signal emitted from the smart processing device, a computing device (e.g., ATM, RFID pad on building, etc.) may transmit a notification to a pre-registered user computing device. The notification may indicate that the smart processing device has been detected and may provide an option to a user to disable functionality, prevent functionality from being used, or the like. For instance, if a smart processing device is being used by an unauthorized user, the notification may be transmitted to the authorized user who may permit or deny the use (e.g., permit authentication processes to continue to prevent enabling functionality).

In some examples, the smart processing device may also communicate with other smart processing devices in order to provide one or more layers of authentication. For instance, detection of a first smart processing device and a second smart processing device may initiate first layer authentication for one or more of the smart processing devices. Accordingly, if a child is attempting to use the first smart processing device, detection of a signal from a parent device (e.g., the second smart processing device) may authorize further authentication of the first smart processing device.

The above-described examples and arrangements are merely some example arrangements in which the systems described herein may be used. Various other arrangements employing aspects described herein may be used without departing from the invention.

Figure 5:
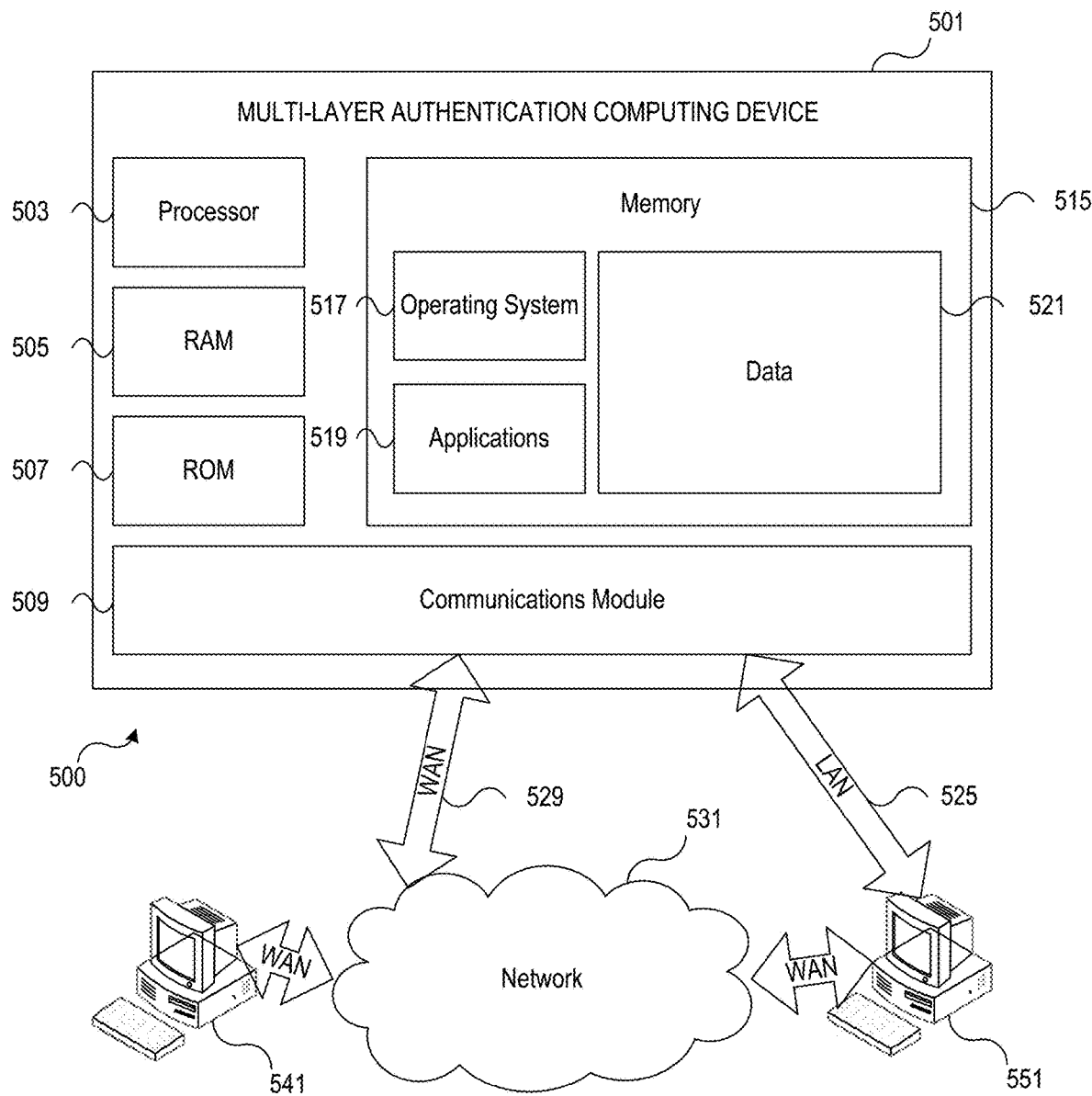
FIG. 5 illustrates one example operating environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include multi-layer authentication computing device 501 having processor 503 for controlling overall operation of multi-layer authentication computing device 501 and its associated components, including Random Access Memory (RAM) 505, Read-Only Memory (ROM) 507, communications module 509, and memory 515. Multi-layer authentication computing device 501 may include a variety of computer readable media. Computer readable media may be any available media that may be accessed by multi-layer authentication computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on multi-layer authentication computing device 501. Such a processor may execute computer-executable instructions stored on a computer-readable medium.

Software may be stored within memory 515 and/or storage to provide instructions to processor 503 for enabling multi-layer authentication computing device 501 to perform various functions as discussed herein. For example, memory 515 may store software used by multi-layer authentication computing device 501, such as operating system 517, application programs 519, and associated database 521. Also, some or all of the computer executable instructions for multi-layer authentication computing device 501 may be embodied in hardware or firmware. Although not shown, RAM 505 may include one or more applications representing the application data stored in RAM 505 while multi-layer authentication computing device 501 is on and corresponding software applications (e.g., software tasks) are running on multi-layer authentication computing device 501.

Communications module 509 may include a microphone, keypad, touch screen, and/or stylus through which a user of multi-layer authentication computing device 501 may provide input, and may also include one or more of a speaker for providing audio output and a video display device for providing textual, audiovisual and/or graphical output. Computing system environment 500 may also include optical scanners (not shown).

Multi-layer authentication computing device 501 may operate in a networked environment supporting connections to one or more remote computing devices, such as computing devices 541 and 551. Computing devices 541 and 551 may be personal computing devices or servers that include any or all of the elements described above relative to multi-layer authentication computing device 501.

The network connections depicted in FIG. 5 may include Local Area Network (LAN) 525 and Wide Area Network (WAN) 529, as well as other networks. When used in a LAN networking environment, multi-layer authentication computing device 501 may be connected to LAN 525 through a network interface or adapter in communications module 509. When used in a WAN networking environment, multi-layer authentication computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
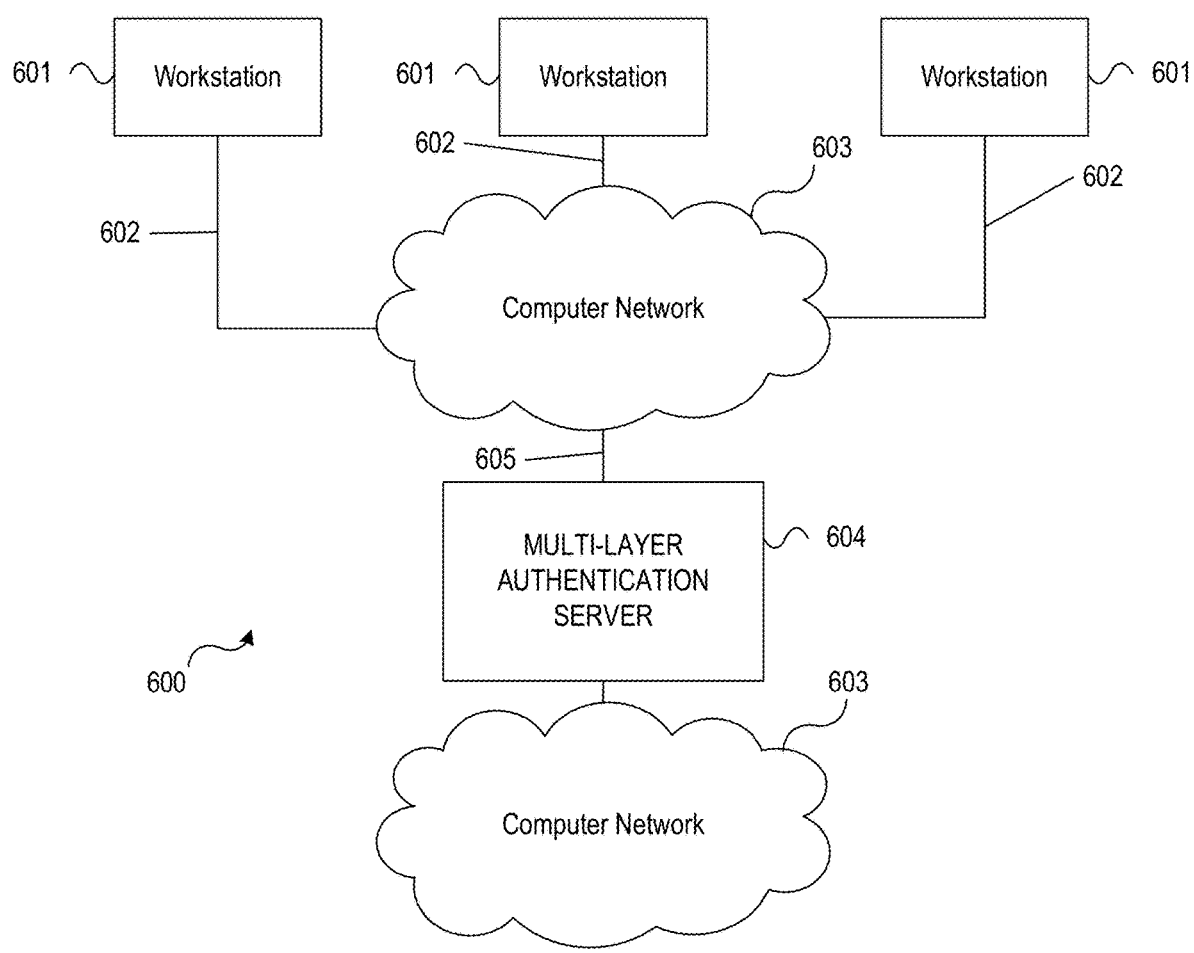
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to multi-layer authentication server 604. In system 600, multi-layer authentication server 604 may be a server, processor, computer, or data processing device, or combination of the same, configured to perform the functions and/or processes described herein. Server 604 may be used to receive and process signal data, generate requests for authentication data, compare authentication response data to pre-stored data, generate and transmit instructions enabling functionality, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and multi-layer authentication server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive data associated with a detected signal emitted from a smart processing device, the detected signal including a frequency of the signal emitted from the smart processing device;
   evaluate the received data, including the frequency of the signal, associated with the detected signal to determine whether it matches pre-stored signal data, the pre-stored signal data including an expected frequency of a signal emitted from the smart processing device;
   responsive to determining that the received data associated with the detected signal does not match pre-stored signal data, generate and transmit an instruction to disable functionality of the smart processing device;
   responsive to determining that the received data associated with the detected signal does match pre-stored signal data:
      generate and transmit an instruction causing display of a first set of data elements on a surface of the smart processing device and enabling a first subset of functionality of a smart processing device, the first subset of functionality including fewer than all functions to be performed using the smart processing device;
      generate a request for next layer authentication data;
      transmit, to the smart processing device, the request for next layer authentication data;
      receive, from the smart processing device, next layer authentication response data;
      compare the received next layer authentication response data to pre-stored next layer authentication data;
      responsive to determining that the received next layer authentication data does not match pre-stored next layer authentication data, generate and transmit, to the smart processing device, an instruction to disable functionality of the smart processing device; and
      responsive to determining that the received next layer authentication response data does match pre-stored next layer authentication data, generate and transmit, to the smart processing device, an instruction causing display of a second set of data elements on the surface of the smart processing device and enabling a second subset of functionality of the smart processing device, the second subset of functionality including the functionality of the first subset of functionality and additional functionality and the second set of data elements including the first set of data elements and additional data elements.

2. The computing platform of claim 1, wherein the second subset of functionality includes fewer than all functions to be performed by the smart processing device.

3. The computing platform of claim 1, wherein the first subset of functionality includes enabling a chip embedded in the smart processing device for use for processing transactions below a predetermined amount.

4. The computing platform of claim 1, wherein the detected signal is emitted from the smart processing device and is detected by a separate computing device.

5. The computing platform of claim 1, wherein causing display of the first set of data elements includes causing display of the first set of data elements on the surface of the smart processing device that was previously blank.

6. A method, comprising:
at a computing platform comprising at least one processor, memory, and a communication interface:
receiving, by the at least one processor, via the communication interface and from a smart processing device, data associated with a detected signal emitted from the smart processing device, the detected signal including a frequency of the signal emitted from the smart processing device;
evaluating, by the at least one processor, the received data, including the frequency of the signal, associated with the detected signal to determine whether it matches pre-stored signal data, the pre-stored signal data including an expected frequency of a signal emitted from the smart processing device;
if it is determined that the received data associated with the detected signal does not match pre-stored signal data, generating and transmitting, by the at least one processor and via the communication interface, an instruction to disable functionality of the smart processing device;
if it is determined that the received data associated with the detected signal does match pre-stored signal data:
generating and transmitting, by the at least one processor and via the communication interface, an instruction causing display of a first set of data elements on a surface of the smart processing device and enabling a first subset of functionality of a smart processing device, the first subset of functionality including fewer than all functions to be performed using the smart processing device;
generating, by the at least one processor, a request for next layer authentication data;
transmitting, by the at least one processor via the communication interface and to the smart processing device, the request for next layer authentication data;
receiving, by the at least one processor via the communication interface and from the smart processing device, next layer authentication response data;
comparing, by the at least one processor, the received next layer authentication response data to pre-stored next layer authentication data;
if it is determined that the received next layer authentication data does not match pre-stored next layer authentication data, generating and transmitting, by the at least one processor via the communication interface and to the smart processing device, an instruction to disable functionality of the smart processing device; and
if it is determined that the received next layer authentication response data does match pre-stored next layer authentication data, generating and transmitting, by the at least one processor via the communication interface and to the smart processing device, an instruction causing display of a second set of data elements on the surface of the smart processing device and enabling a second subset of functionality of the smart processing device, the second subset of functionality including the functionality of the first subset of functionality and additional functionality and the second set of data elements including the first set of data elements and additional data elements.

7. The method of claim 6, wherein the second subset of functionality includes fewer than all functions to be performed by the smart processing device.

8. The method of claim 6, wherein the first subset of functionality includes enabling a chip embedded in the smart processing device for use for processing transactions below a predetermined amount.

9. The method of claim 6, wherein the detected signal is emitted from the smart processing device and is detected by a separate computing device.

10. One or more non-transitory computer-readable media storing instructions that, when executed by a computing platform comprising at least one processor, memory, and a communication interface, cause the computing platform to:
receive data associated with a detected signal emitted from a smart processing device, the detected signal including a frequency of the signal emitted from the smart processing device;
evaluate the received data, including the frequency of the signal, associated with the detected signal to determine whether it matches pre-stored signal data, the pre-stored signal data including an expected frequency of a signal emitted from the smart processing device;
responsive to determining that the received data associated with the detected signal does not match pre-stored signal data, generate and transmit an instruction to disable functionality of the smart processing device;
responsive to determining that the received data associated with the detected signal does match pre-stored signal data:
generate and transmit an instruction causing display of a first set of data elements on a surface of the smart processing device and enabling a first subset of functionality of a smart processing device, the first subset of functionality including fewer than all functions to be performed using the smart processing device;
generate a request for next layer authentication data;
transmit, to the smart processing device, the request for next layer authentication data;
receive, from the smart processing device, next layer authentication response data;
compare the received next layer authentication response data to pre-stored next layer authentication data;
responsive to determining that the received next layer authentication data does not match pre-stored next layer authentication data, generate and transmit, to the smart processing device, an instruction to disable functionality of a smart processing device; and
responsive to determining that the received next layer authentication response data does match pre-stored next layer authentication data, generate and transmit, to the smart processing device, an instruction causing display of a second set of data elements on the surface of the smart processing device and enabling a second subset of functionality of the smart processing device, the second subset of functionality including the functionality of the first subset of functionality and additional functionality and the second set of data elements including the first set of data elements and additional data elements.

11. The one or more non-transitory computer-readable media of claim 10, wherein the second subset of functionality includes fewer than all functions to be performed by the smart processing device.

12. The one or more non-transitory computer-readable media of claim 10, wherein the first subset of functionality includes enabling a chip embedded in the smart processing device for use for processing transactions below a predetermined amount.

13. The one or more non-transitory computer-readable media of claim 10, wherein the detected signal is emitted from the smart processing device and is detected by a separate computing device.

* * * * *